US009714319B2

(12) United States Patent
Cernohous et al.

(10) Patent No.: US 9,714,319 B2
(45) Date of Patent: *Jul. 25, 2017

(54) BIODEGRADABLE POLYMER COMPOSITIONS

(71) Applicant: Stratasys, Inc., Eden Prairie, MN (US)

(72) Inventors: Jeffrey J. Cernohous, Hudson, WI (US); Garrett S. Van Gorden, River Falls, WI (US)

(73) Assignee: Stratasys, Inc., Eden Prairie, MN (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/615,009

(22) Filed: Feb. 5, 2015

(65) Prior Publication Data

US 2015/0152217 A1 Jun. 4, 2015

Related U.S. Application Data

(63) Continuation of application No. 13/256,336, filed as application No. PCT/US2010/027934 on Mar. 19, 2010, now Pat. No. 8,981,002.

(60) Provisional application No. 61/161,546, filed on Mar. 19, 2009.

(51) Int. Cl.
| | |
|---|---|
| C04B 28/04 | (2006.01) |
| C08G 63/60 | (2006.01) |
| C08G 63/08 | (2006.01) |
| C08K 5/00 | (2006.01) |
| C08K 5/10 | (2006.01) |
| C08K 5/14 | (2006.01) |
| C08K 5/3492 | (2006.01) |
| C08L 101/00 | (2006.01) |
| C08L 101/16 | (2006.01) |
| C08G 83/00 | (2006.01) |
| C08K 5/52 | (2006.01) |
| C08K 5/49 | (2006.01) |

(52) U.S. Cl.
CPC ........... *C08G 63/08* (2013.01); *C08G 83/005* (2013.01); *C08K 5/0033* (2013.01); *C08K 5/10* (2013.01); *C08K 5/14* (2013.01); *C08K 5/34928* (2013.01); *C08K 5/5205* (2013.01); *C08L 101/005* (2013.01); *C08L 101/16* (2013.01); *C08G 2261/132* (2013.01); *C08K 5/0066* (2013.01); *C08K 5/49* (2013.01)

(58) Field of Classification Search
CPC .. C08L 101/00; C08L 101/005; C08L 101/02; C08L 101/16; C08G 83/005; C08G 83/006; C08G 2231/132
USPC ..................... 524/8, 599, 612, 702
See application file for complete search history.

(56) References Cited

U.S. PATENT DOCUMENTS

| | | | |
|---|---|---|---|
| 4,863,538 A | 9/1989 | Deckard | |
| 5,121,329 A | 6/1992 | Crump | |
| 5,132,143 A | 7/1992 | Deckard | |
| 5,303,141 A | 4/1994 | Batchelder et al. | |
| 5,340,433 A | 8/1994 | Crump | |
| 5,474,719 A | 12/1995 | Fan et al. | |
| 5,503,785 A | 4/1996 | Crump et al. | |
| 5,695,707 A | 12/1997 | Almquist et al. | |
| 5,773,510 A | 6/1998 | Kazmaier et al. | |
| 5,939,008 A | 8/1999 | Comb et al. | |
| 5,952,433 A | 9/1999 | Wang et al. | |
| 5,998,503 A | 12/1999 | Jacobson et al. | |
| 6,004,124 A | 12/1999 | Swanson et al. | |
| 6,022,207 A | 2/2000 | Dahlin et al. | |
| 6,070,107 A | 5/2000 | Lombardi et al. | |
| 6,114,489 A | 9/2000 | Vicari et al. | |
| 6,129,872 A | 10/2000 | Jang | |
| 6,165,406 A | 12/2000 | Jang et al. | |
| 6,175,422 B1 | 1/2001 | Penn et al. | |
| 6,207,782 B1 | 3/2001 | Czech et al. | |
| 6,225,404 B1 | 5/2001 | Sorensen et al. | |
| 6,228,923 B1 | 5/2001 | Lombardi et al. | |
| 6,645,412 B2 | 11/2003 | Priedeman, Jr. | |
| 6,722,872 B1 | 4/2004 | Swanson et al. | |
| 6,790,403 B1 | 9/2004 | Priedeman, Jr. et al. | |
| 6,814,907 B1 | 11/2004 | Comb | |
| 7,236,166 B2 | 6/2007 | Zinniel et al. | |
| 7,255,821 B2 | 8/2007 | Priedeman, Jr. et al. | |
| 7,265,160 B2 | 9/2007 | Oka et al. | |
| 7,267,170 B2 | 9/2007 | Mang et al. | |
| 7,368,503 B2 | 5/2008 | Hale | |
| 7,449,510 B2 | 11/2008 | Ueda et al. | |
| 7,589,151 B2 | 9/2009 | Aoki et al. | |
| 7,632,897 B2 | 12/2009 | Matsumoto et al. | |
| 7,645,823 B2 | 1/2010 | Horie et al. | |
| 7,666,922 B2 | 2/2010 | Yao | |
| 7,754,807 B2 | 7/2010 | Priedeman, Jr. et al. | |
| 7,767,732 B2 | 8/2010 | Ueda et al. | |
| 7,790,069 B2 | 9/2010 | Kiuchi et al. | |
| 8,246,888 B2 | 8/2012 | Hopkins et al. | |
| 2002/0002242 A1 | 1/2002 | McNamara et al. | |
| 2004/0222561 A1 | 11/2004 | Hopkins | |
| 2005/0004282 A1 | 1/2005 | Priedeman, Jr. et al. | |

(Continued)

FOREIGN PATENT DOCUMENTS

| | | | |
|---|---|---|---|
| EP | 2003158 A2 | 12/2008 | |
| WO | 2011103479 A2 | 8/2011 | |

OTHER PUBLICATIONS

Carsten Gottschalk et al.: "Hyperbranched Polylactide Copolymers", Macromolecules, vol. 39, No. 5, Mar. 2006, pp. 1719-1723, XP055046902, ISSN: 0024-9297, DOI: 10.1021/ma0513259.

(Continued)

*Primary Examiner* — Jane L Stanley
(74) *Attorney, Agent, or Firm* — Peter J. Ims; Westman, Champlin & Koehler, P.A.

(57) ABSTRACT

Hyper-branched biodegradable polymers are produced by melt processing biodegradable polymers with a branching agent at temperatures that promote free radical reactions between the biodegradable polymer and the branching agent. The biodegradable compositions have an excellent balance of mechanical properties and are suitable for flame retardant applications.

20 Claims, No Drawings

(56) References Cited

U.S. PATENT DOCUMENTS

| | | |
|---|---|---|
| 2005/0014871 A1 | 1/2005 | Chin |
| 2005/0143502 A1 | 6/2005 | Yamada et al. |
| 2006/0142421 A1 | 6/2006 | Ihara et al. |
| 2006/0211822 A1 | 9/2006 | Varlet et al. |
| 2006/0217469 A1 | 9/2006 | Bauer et al. |
| 2006/0247387 A1 | 11/2006 | Mohanty et al. |
| 2007/0066766 A1 | 3/2007 | Chen et al. |
| 2007/0176154 A1 | 8/2007 | Murase et al. |
| 2007/0244227 A1 | 10/2007 | Eipper et al. |
| 2007/0276090 A1 | 11/2007 | Aoki et al. |
| 2007/0299170 A1 | 12/2007 | Ozawa et al. |
| 2008/0071015 A1 | 3/2008 | Kiuchi et al. |
| 2008/0108729 A1 | 5/2008 | Ueda et al. |
| 2008/0157036 A1 | 7/2008 | Ogawa et al. |
| 2008/0194739 A1 | 8/2008 | Yamashita et al. |
| 2008/0194741 A1 | 8/2008 | Engelmann et al. |
| 2008/0213419 A1 | 9/2008 | Skubic et al. |
| 2008/0221265 A1 | 9/2008 | Sodergard et al. |
| 2009/0197999 A1 | 8/2009 | Shen et al. |
| 2009/0239433 A1 | 9/2009 | Kurihara et al. |
| 2009/0326152 A1 | 12/2009 | Li et al. |
| 2010/0041831 A1 | 2/2010 | Chung et al. |
| 2010/0096072 A1 | 4/2010 | Hopkins et al. |
| 2010/0096485 A1 | 4/2010 | Taatjes et al. |
| 2010/0140849 A1 | 6/2010 | Comb et al. |

OTHER PUBLICATIONS

David E. Henton et al.: "Natural Fibers, Biopolymers, and Biocomposites", Chapter 16 Polylactic Acid Technology, p. 527, and 542-544, Mar. 2005.

BIODEGRADABLE POLYMER COMPOSITIONS

CROSS REFERENCE TO RELATED APPLICATIONS

This Application is a Continuation Application of U.S. patent application Ser. No. 13/256,336, filed Sep. 13, 2011, which is a Section 371 National Stage Application of International Application No. PCT/US2010/027934, filed Mar. 19, 2010, published as WO 2010/108076 A1 on Sep. 23, 2010, in English, which is based on and claims the benefit of U.S. Provisional Patent Application No. 61/161,546 filed Mar. 19, 2009.

TECHNICAL FIELD

The present invention relates to a flame retardant composition. Specifically, the present invention is a combination of a biodegradable polymer and a branching agent to form hyper-branched polymers that possess superior flame retardant and mechanical properties.

BACKGROUND

Biodegradable polymer compositions are widely utilized in numerous applications, including automotive, home construction, electronic and consumer good products. The polymers may be composed of either bio-based polymers or petroleum-based polymers. The biodegradation of the polymer is preferred to address environmental concerns associated with disposal of the materials once they are no longer useful for their intended purpose. However, the polymers must meet certain physical and chemical characteristics in order for them to be suitable for the intended application. One frequent requirement of biodegradable polymers in certain applications is that they must be flame retardant. However, certain flame retardants, such as halogen compounds, may generate harmful gases during combustion.

The addition of conventional flame retardant materials to a polymer composition may adversely impact the physical characteristics of the composition, ultimately rendering the composition unsuitable or undesirable for its intended purpose. Highly filled flame retardant polymers are often inferior physical characteristics compared to competitive materials due to their molecular architecture. Such materials are often incapable of achieving the desired strength and impact characteristics. Other flame retardant compositions offer molecular architecture that potentially limits the subsequent processing once the multi-component composition is created.

SUMMARY OF THE INVENTION

The biodegradable polyester compositions of this invention have an excellent balance of mechanical properties and enable the melt processing of the compositions once they are initially admixed. The combination of these attributes is a function of the molecular architecture of the compositions. In one embodiment, the hyper-branched biodegradable polymers of this invention are produced by melt processing biodegradable polymers with a branching agent at temperatures that promote free radical reactions between the biodegradable polymer and the branching agent. In one embodiment, the polymer is a biodegradable linear polyester and the branching agent is a ethylenically unsaturated compound. The composition possesses certain flame retardant characteristics without employing conventional flame retardant compounds.

The hyper-branched composition embodied in the present invention has a molecular structure that is in part created by the branching agent utilized in the composition. In one embodiment, the branching agent(s) of this invention include multifunctional compounds that can undergo free radical homolysis reactions and react with the biodegradable polyester during melt processing to form a hyper-branched biodegradable polyester. The degree of branching and interaction of the polymer chains possesses characteristics of a higher molecular weight material while still being subsequently melt processable.

The hyper-branched polymer may demonstrate flame retardant characteristics as indicated by a passing rating on UL 94 test parameters. Alternatively, a flame retardant, such as a phosphorus based compound, may be added to enhance flame retardant characteristics. Such compositions possess desired mechanical properties and the polymer is self-extinguishing.

For purposes of the present invention, the following terms used in this application are defined as follows:

"Biodegradable Polymer" means a polymeric material or resin that is capable of chemically degrading into lower molecular weight materials.

"Composite" means a mixture of a polymeric material and an additive or filler.

"Hyper-branched" means a melt processable polymer with three or more chain ends.

"Melt Processable Composition" means a formulation that is melt processed, typically at elevated temperatures, by means of a conventional polymer processing technique such as extrusion or injection molding as an example.

"Melt Processing Techniques" means extrusion, injection molding, blow molding, rotomolding, or batch mixing.

The above summary of the present invention is not intended to describe each disclosed embodiment or every implementation of the preset invention. The detailed description that follows more particularly exemplifies illustrative embodiments.

DETAILED DESCRIPTION

Polymers of this invention are produced by melt processing biodegradable polymers with a branching agent. The biodegradable polymers may include those polymers generally recognized by those of ordinary skill in the art to decompose into compounds having lower molecular weights. Non-limiting examples of biodegradable polymers suitable for practicing the present invention include polysaccharides, peptides, aliphatic polyesters, polyamino acids, polyvinyl alcohol, polyamides, polyalkylene glycols, and copolymers thereof.

In one aspect the, the biodegradable polymer is a linear polyester. Non-limiting examples of linear polyesters include polylactic acids, poly-L-lactic acid (PLLA), and a random copolymer of L-lactic acid and D-lactic acid, and derivatives thereof. Other non-limiting examples of polyesters include polycaprolactone, polyhydroxybutyric acid, polyhydroxyvaleric acid, polyethylene succinate, polybutylene succinate, polybutylene adipate, polymalic acid, polyglycolic acid, polysuccinate, polyoxalate, polybutylene diglycolate, and polydioxanone.

In one embodiment, the branching agent(s) of this invention include multifunctional compounds that can undergo free radical homolysis reactions and react with the biodegradable polyester during melt processing to form a hyper-branched biodegradable polyester. Branching agents suitable for use in this invention include organic compounds that contain multiple ethylenically unsaturated sites capable of reacting with free radical species present during melt processing. Specific examples of useful ethylenically unsaturated branching agents may include multifunctional acrylate and methacrylate compounds. Non-limiting examples of multifunctional compounds include: 1,6-hexanediol dimethacrylate, 1,6-hexanediol diacrylate, ethylene glycol dimethacrylate, ethylene glycol diacrylate, trimethylol propane triacrylate, trimethylol propane trimethacrylate, glycerol trimethacrylate, glycerol triacrylate, glycerol dimethacrylate, glycerol diacrylate, pentaerythritol triacrylate, pentaerythritol trimethacrylate, pentaerythritol tetraacrylate, pentaerythritol tetramethacrylate. Branching agents of this invention include multifunctional acrylates or methacrylates having at least three unsaturated acrylic or methacrylic moieties per molecule.

In one alternative embodiment, the materials utilized to derive the hyper-branched polymer may optionally include a free radical initiator along with the branching agent. A free radical initiator is a species that when melt processed forms reactive free radical moieties. Free radical initiators useful in this invention include organic peroxides and diazocompounds. Non-limiting examples of specific free radical initiators include: benzoyl peroxide, dicumyl peroxide, di-tert-butyl peroxide and azoisobutrylnitrile. The free radical initiator may be included in the melt processable composition at amounts less than 0.25% by weight.

In another embodiment, impact modifying additives may be added or incorporated into the composition to address desired physical characteristics of the melt processable composition. Non-limiting examples of impact modifiers useful in this invention include elastomeric copolyesters, polyalkylene glycols and functionalized naturally occurring oils. Examples of elastomeric polyesters include, but are not limited to, those sold under the Neostar (Eastman Chemical Co., Kingsport, Tenn.), Biomax (DuPont, Wilmington, Del.) and Hytrel (DuPont) tradenames. Non-limiting examples of polyalkylene glycols include polyethylene glycols sold under the Carbowax tradename (Dow Chemical Co., Midland, Mich.). Non-limiting examples of functionalized naturally occurring oils include: malinated or epoxidized soybean, linseed or sunflower oils, which are commercially available from Cargill Inc.

The present invention results in hyper-branched polymers. Hyper-branching is distinct and different from certain forms of crosslinked polymers because it permits subsequent melt processing of the polymer. The use of conventional multifunctional monomers in conjunction with a free radical initiator species, such as those recognized by one of ordinary skill in the art, produces a highly crosslinked biodegradable polyester. However, the resulting materials would be difficult, if not impossible to form into an article using a secondary melt processing operation.

The hyper-branched polymer compositions of this invention have an excellent balance of mechanical properties and are melt processable. The combination of these attributes is a function of the molecular architecture of the compositions disclosed here. In one embodiment, the hyper-branched biodegradable polyesters of this invention are produced by melt processing a linear biodegradable polyester with a multifunctional monomer at temperatures that promote free radical reactions between the linear biodegradable polyester and the multifunctional monomer.

The amount of components in the melt processable, hyper-branched composition may vary depending upon the intended end use application. The polymer may comprise from about 20 to about 99 percent by weight of the final composition. The branching agent may be included at a level of up to 10 percent by weight.

In another aspect, flame retardant hyper-branched biodegradable polymer compositions are produced by melt processing a polymer, such as a linear biodegradable polyester, with a branching agent and one or more flame retardant additive(s). Any conventional halogenated or non-halogenated flame retardant additives can be utilized in this invention. The hyper-branched biodegradable polyester of this invention has improved flame retardancy when compared to a linear biodegradable polyester. In one embodiment, the flame retardant hyper-branched polyester, that includes a flame retardant additive demonstrates self extinguishing flame retardant properties. Although halogenated flame retardants can be utilized in this invention, the environmental hazards, biopersistance and toxicity associated with many of these additives make them less viable candidates in biodegradable polymer compositions. Non-halogenated flame retardants are more preferred as they do not suffer from these issues. Non-halogenated flame retardant additive materials useful in this invention include inorganic compounds (such as for example metal hydroxides, metal sulfates, metal nitrates, carbonate compounds, tin compounds, titanium compounds zirconium compounds and molybdenum compounds) silica compounds, phosphorous compounds, boric acid containing compounds, organic compounds, and nitrogen compounds. The flame retardant additive may be included in the melt processable composition at levels of up to 80 percent by weight.

Non-limiting examples of desirable non-halogenated phosphorus based flame retardant additives include: ammonium phosphate, ammonium polyphosphate, melamine phosphate, red phosphorus, phosphoric esters, tris(chloroethyl)phosphate, tris(monochloropropyl)phosphate, tris(dichloropropyl) phosphate, triallyl phosphate, tris(3-hydroxypropyl)phosphate, tris(tribromophenyl)phosphate, tris-.beta.-chloropropyl phosphate, tris(dibromophenyl)phosphate, tris(tribromoneopentyl)phosphat-e,tetrakis(2-chloroethyl)ethylenediphosphate, dimethyl methylphosphate, tris (2-chloroethyl) orthophosphate, aromatic condensed phosphates, halogen-containing condensed organophosphates, ethylenebis[tris(2-cyanoet-hyl)]phosphonium bromide, ammonium polyphosphate, .beta.-chloroethyl acid phosphate, butyl pyrophosphate, butyl acid phosphate, butoxyethyl acid phosphate, 2-ethylhexyl acid phosphate, melamine phosphate, halogen-containing phosphates, and phenylphosphonic acid. In one aspect ammonium polyphosphate is utilized as the flame retardant additive.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, compatibilizers, tackifiers, colorants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The melt processable, hyper-branched composition of the invention can be prepared by any of a variety of ways. For example, the biodegradable polymer, branching agent, optional flame retardant and optional additives can be combined together by any of the blending means usually employed in the plastics industry, such as with a compounding mill, a Banbury mixer, or a mixing extruder. The materials may be used in the form, for example, of a powder, a pellet, or a granular product. The mixing operation is most conveniently carried out at a temperature above the melting point or softening point of the polymer. The resulting melt-blended mixture can be either extruded directly into the form of the final product shape or pelletized or otherwise comminuted into a desired particulate size or size distribution and fed to an extruder, which typically will be a twin-screw extruder, that melt-processes the blended mixture to form the final product shape. Alternatively, the composition may be molded into a desired form. The resulting composite exhibits superior performance results when the hyper-branched polymer is produced using this protocol.

In another embodiment, the flame retardant additive is melt processed with the biodegradable polymer to form a masterbatch. This masterbatch may optionally contain the branching agent. The masterbatch is then let down to the desired level of flame retardant additive in a subsequent melt processing step. This two step process can have the effect of improving the dispersion of the flame retardant additive and the chemical and mechanical properties of the final compound. In an alternative embodiment, the flame retardant masterbatch is made in the presence of the branching agent and a free radical initiator is added during a subsequent processing step. This two step process produces a particularly useful, biodegradable, hyper-branched flame retardant polymer composition. Those skilled in the art of melt processing polymer compositions are capable of selecting processing steps to achieve a desired level of intermixed components.

Melt-processing typically is performed at a temperature from 80.degree. to 300.degree. C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The composites of this invention are suitable for manufacturing articles in the construction, electronics, consumer goods and automotive industries. For example, articles incorporating the composition of the present invention may include: molded architectural products, forms, automotive parts, building components, household articles, or electronic hard goods.

The resulting articles produced by melt processing the inventive composition exhibit superior mechanical characteristics. For example, a hyper-branched polymer has one or more of an impact strength greater than 265 joules per meter (unnotched) and flexural modulus of greater than 2300 megapascals. Additionally, the composition exhibits self extinguishing properties under UL 94 test procedures. In certain embodiments, the hyper-branched polymer has a rating of HB on the UL 94 horizontal flame retardant test. Additionally, with the inclusion of a flame retardant compound, the hyper-branched polymer has one or more of an impact strength greater than 200 joules/meter (unnotched) and flexural modulus of greater than 3000 megapascals. The hyper-branched polymer with a flame retardant composition is capable of achieving a ClassI/A rating under the ASTM E84-08 test or the comparable ANSI/UL 723 test. The hyper-branched polymer with a flame retardant composition is also capable of achieving a rating of V2, V1 or V0 on the UL 94 vertical flame retardant test.

Examples

Materials used to generate the following examples include:

| Material | Description |
| --- | --- |
| PLA | Ingeo 2002D poly(lactic acid), commercially available from NatureWorks LLC (Minneapolis, MN) |
| FR | Melamine Polyphosphate, Melapur 200, commercially available from Ciba Inc. (Tarrytown, NY) |
| Branching Agent 1 | Pentaerythritoltetraacrylate, commercially available from Aldrich Chemical Co. (Milwaukee, WI) |
| Initiator 1 | Dicumyl Peroxide, commercially available from Sigma Aldrich (Milwaukee, WI) |

Biodegradable polymer compositions were prepared using the following protocol. PLA, Branching Agent and optionally FR were dry mixed in a plastic bag and gravity fed into a 26 mm co-rotating twin screw extruder (40:1, L:D) fitted with a four strand die (commercial available from Labtech Engineering, Samutprakarn, Thailand). All samples were processed at 200 rpm screw speed using the following temperature profile: Zone 1-2=130.degree. C., Zone 3-4=150.degree. C., Zone 5-6=170.degree. C., Zone 7-8=170.degree. C., Die=170.degree. C. The resulting strands were subsequently cooled in a water bath and pelletized into 0.64 cm pellets. The resulting pellets were injection molded into test specimens following ASTM D638 (tensile) and D790 (flexural) specifications. Injection molding on biodegradable polymer formulations was performed using an 85 ton machine (commercially available from Engel Corporation, York, Pa.) having a barrel and nozzle temperature of 175.degree. C. The flexural and impact properties were subsequently tested as specified in ASTM D790 and D256; respectively. The flame retardant properties were testing following either the UL-94 Horizontal or Vertical Burning Test Methods. Melt flow index was determined as specified in ASTM D1238. In all cases, the test was performed at 190.degree. C. using a 2.1 Kg load.

Table 1 gives the formulations for biodegradable polymer compositions comparative example CE1-CE3 and examples 1-7 that were produced. Table 2 gives the mechanical and flame retardant properties for biodegradable polymer compositions comparative example CE1-CE3 and examples 1-7.

TABLE 1

Formulations for Biodegradable Polymer Formulations Comparative Example CE1-CE3 and Examples 1-7

| Example | PLA (wt %) | FR (wt %) | Branching Agent 1 (wt %) | Initiator (wt %) |
| --- | --- | --- | --- | --- |
| CE1 | 100 | — | — | |
| 1 | 99 | — | 1 | |
| 2 | 97.5 | — | 2.5 | |
| CE2 | 99 | 10 | — | |
| CE3 | 97.5 | 20 | — | |

TABLE 1-continued

Formulations for Biodegradable Polymer Formulations
Comparative Example CE1-CE3 and Examples 1-7

| Example | PLA (wt %) | FR (wt %) | Branching Agent 1 (wt %) | Initiator (wt %) |
|---|---|---|---|---|
| 3 | 79.75 | 10 | 0.25 | |
| 4 | 69.75 | 20 | 0.25 | |
| 5 | 79.65 | 10 | 0.25 | 0.1 |
| 6 | 79.5 | 10 | 0.25 | 0.25 |
| 7 | 79.25 | 10 | 0.25 | 0.5 |

TABLE 2

Mechanical Properties of Comparative Examples CE1-CE3 and Examples 1-7

| Example | Flexural Modulus (MPa) | Flexural Strength (MPa) | Unnotched Impact Strength (J/m) | UL-94 Horizontal Burn Distance (mm/min) | UL-94 Vertical Burn Rating | Melt Flow Index (g/10 min) |
|---|---|---|---|---|---|---|
| CE1 | 2830 | 98 | 254 | 122 | Not Rated | 10.2 |
| 1 | 2850 | 105 | 376 | 78 | Not Rated | 8.4 |
| 2 | 2850 | 90 | 417 | 53 | Not Rated | 6.3 |
| CE2 | 3550 | 97 | 160 | N/A | V2 | 10.7 |
| CE3 | 3900 | 81 | 144 | N/A | V2 | 9.4 |
| 3 | 3480 | 102 | 204 | N/A | V2 | 6.6 |
| 4 | 4103 | 84 | 182 | N/A | V0 | 6.5 |
| 5 | 3660 | 102 | 204 | N/A | V2 | 4.5 |
| 6 | 3780 | 106 | 228 | N/A | V2 | 1.1 |
| 7* | N/A | N/A | N/A | N/A | N/A | <0.2 |

*Sample 7 was incapable of being injection molded/melt processed

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

The invention claimed is:

1. A melt processable polymer comprising a biodegradable polymer bonded with a branching agent through free radical reactions to form a hyper-branched polymer, wherein the hyper-branched polymer is produced by melt processing the biodegradable polymer with the branching agent at temperatures that promote the free radical reactions between the biodegradable polymer and the branching agent and wherein the hyper-branched polymer is capable of a secondary melt processing procedure to produce an article having a selected shape, wherein the biodegradable polymer comprises a linear polyester and the branching agent comprises a multifunctional monomer capable of undergoing free radical hemolysis.

2. The polymer of claim 1, wherein the biodegradable polymer comprises a linear polyester.

3. The polymer of claim 2, wherein the linear polyester comprises one or more selected from the group consisting of polylactic acids, poly-L-lactic acid (PLLA), and a random copolymer of L-lactic acid and D-lactic acid.

4. The polymer of claim 1, wherein the biodegradable polymer comprises a polyester selected from the group consisting of polycaprolactone, polyhydroxybutyric acid, polyhydroxyvaleric acid, polyethylene succinate, polybutylene succinate, polybutylene adipate, polymalic acid, polyglycolic acid, polysuccinate, polyoxalate, polybutylene diglycolate, and polydioxanone.

5. The polymer of claim 1, wherein the branching agent comprises organic compounds comprising multiple ethylenically unsaturated sites.

6. The polymer of claim 5, wherein the branching agent comprises multifunctional acrylate and methacrylate compounds.

7. The polymer of claim 6, wherein the branching agent is selected from the group consisting of 1,6-hexanediol dimethacrylate, 1,6-hexanediol diacrylate, ethylene glycol dimethacrylate, ethylene glycol diacrylate, trimethylol propane triacrylate, trimethylol propane trimethacrylate, glycerol trimethacrylate, glycerol triacrylate, glycerol dimethacrylate, glycerol diacrylate, pentaerythritol triacrylate, pentaerythritol trimethacrylate, pentaerythritol tetraacrylate and pentaerythritol tetramethacrylate.

8. The polymer of claim 1 and further comprising a free radical initiator comprising organic peroxides, diazocompounds, or a combination thereof.

9. The polymer of claim 8, wherein the free radical initiator is selected from the group consisting of benzoyl peroxide, dicumyl peroxide, di-tert-butyl peroxide and azoisobutrylnitrile.

10. The polymer of claim 8, wherein the melt processable polymer comprises less than 0.25% by weight of the free radical initiator.

11. The polymer of claim 1 and further comprising an impact modifying additive selected from the group consisting of elastomeric copolyesters, polyaklylene glycols, malinated or epoxidized naturally occurring oils, and combinations thereof.

12. The polymer of claim 1, wherein the melt processable polymer comprises from about 20 to about 99 percent by weight of the hyper-branched polymer.

13. The polymer of claim 1, wherein the melt processable polymer comprises up to 10 percent by weight of the branching agent.

14. A method of producing a melt-processable hyper-branched polymer, the method comprising:
providing a biodegradable polymer comprising a linear polyester;
providing a branching agent comprising a multifunctional monomer capable of undergoing free radical hemolysis; and
processing the biodegradable polymer with the branching agent at temperatures resulting in free radical reactions between the biodegradable polymer and the branching agent to form the hyper branched polymer and wherein the hyper-branched polymer is capable of a subsequent melt processing process.

15. The method of claim 14, further comprising providing a free radical initiator along with the biodegradable polymer and the branching agent to initiate the free radical reactions between the biodegradable polymer and the branching agent to form the hyper branched polymer.

16. The method of claim 14, further comprising providing an impact modifying additive along with the biodegradable polymer and the branching agent wherein the impact modifying additive is selected from the group consisting of elastomeric copolyesters, polyaklylene glycols, malinated or epoxidized naturally occurring oils and combinations thereof.

17. The method of claim 14, wherein the biodegradable polymer comprises a linear biodegradable polymer.

18. A method of forming an article, the method comprising:
providing a feedstock produced by melt processing a biodegradable polymer comprising a linear polyester, a free radical initiator and a branching agent comprising a multifunctional monomer capable of undergoing free radical hemolysis, at a temperature resulting in free radical reactions between the biodegradable polymer and the branching agent to form a hyper-branched polymer; and melt processing the hyper-branched polymer at a temperature between about 80° C. and 300° C. to form the article, wherein the article has a selected shape.

19. The method of claim 18 wherein processing comprises extruding, injection molding, blow molding, rotomolding or combinations thereof to form the article.

20. The method of claim 19, wherein the biodegradable polymer comprises a linear biodegradable polymer.

* * * * *

UNITED STATES PATENT AND TRADEMARK OFFICE
CERTIFICATE OF CORRECTION

PATENT NO.        : 9,714,319 B2
APPLICATION NO.   : 14/615009
DATED             : July 25, 2017
INVENTOR(S)       : Jeffrey J. Cernohous and Garrett S. Van Gorden Page 1 of 1

It is certified that error appears in the above-identified patent and that said Letters Patent is hereby corrected as shown below:

Related U.S. Application Data:
Please delete "Continuation of application No. 13/256,336, filed as application No. PCT/US2010/027934 on Mar. 19, 2010, now Pat. No. 8,981,002" and insert --Continuation of application No. 13/256,336, filed on Sep. 13, 2011, now Pat. No. 8,981,002, which is a 371 of application No. PCT/US2010/027934 filed on Mar. 19, 2010--

Signed and Sealed this
Eighth Day of May, 2018

Andrei Iancu
*Director of the United States Patent and Trademark Office*